United States Patent [19]

Martin et al.

[11] 4,069,393

[45] Jan. 17, 1978

[54] WORD RECOGNITION APPARATUS AND METHOD

[75] Inventors: Thomas B. Martin, Burlington; Marvin B. Herscher, Camden; Robert B. Cox, Cinnaminson, all of N.J.

[73] Assignee: Threshold Technology, Inc., Delran, N.J.

[21] Appl. No.: 531,543

[22] Filed: Dec. 11, 1974

Related U.S. Application Data

[63] Continuation of Ser. No. 291,051, Sept. 21, 1972, abandoned.

[51] Int. Cl.² .............................................. G10L 1/00
[52] U.S. Cl. .................................................. 179/1 SD
[58] Field of Search ............... 179/1 SD, 1 SA, 1 SB, 179/1 VS; 340/146.3 WD

[56] References Cited

U.S. PATENT DOCUMENTS

| | | | |
|---|---|---|---|
| 3,509,280 | 4/1970 | Jones | 179/1 SB |
| 3,536,837 | 10/1970 | Fenton | 179/1 VF |
| 3,588,363 | 6/1971 | Herscher et al. | 179/1 SD |
| 3,592,969 | 7/1971 | Yoshino | 179/1 SA |
| 3,673,331 | 7/1972 | Hair et al. | 179/15 B |
| 3,700,815 | 10/1970 | Doddington | 179/1 SA |
| 3,770,891 | 10/1973 | Kalfaian | 179/1 SB |
| 3,770,892 | 11/1973 | Clapper | 179/1 SB |

*Primary Examiner*—Kathleen H. Claffy
*Assistant Examiner*—E. S. Kemeny
*Attorney, Agent, or Firm*—Martin Novack

[57] ABSTRACT

An apparatus which receives spoken input training words and a subsequent spoken input command word and generates a correlation function is indicative of the resemblance of the command word to each training word. A feature extraction means processes received input words and generates digital feature output signals on particular ones of a number of feature output lines. Means are provided for storing, as a time dependent matrix, the status of the feature signals which occur during each training word. Means are also provided for storing as a time dependent matrix, the status of the feature signals which occur during the command word. Further means are provided for comparing, member by member, the command word matrix with each training word matrix and for generating a correlation figure which reflects each comparison. In a preferred embodiment of the invention, means are provided for time normalizing the matrices representative of the training words and the command word before the comparisons are made.

27 Claims, 7 Drawing Figures

WORD RECOGNITION APPARATUS AND METHOD

This application is a continuation of Ser. No. 291,051, filed Sept. 21, 1972, now abandoned.

BACKGROUND OF THE INVENTION

This invention relates to speech recognition apparatus and, more particularly, to an apparatus which receives spoken input training words and a subsequent spoken input command word and generates a correlation function that is indicative of the resemblance of the command word to each training word.

There have been previously developed various equipments that attempt to recognize limited vacabularies of spoken words by analysis of acoustic events. Typically, such equipments are envisioned as being useful in "voice command" applications wherein, upon recognizing particular words, the equipment produces electrical signals which control the operation of a companion system. For example, a voice command could be used to control a conveyor belt to move in a specified manner or may control a computer to perform specified calculations.

Previous efforts to develop automatic methods of speech recognition have had limited success and have led to the realization of the exceedingly complex nature of speech communication. Normal speech has a high information content with considerable variability from speaker to speaker and some variability even in the same word when spoken by the same individual. Therefore, a "perfect" recognition scheme is unattainable since the nature of the speech signal to be recognized cannot be precisely defined. As a result, the preferred past schemes have been empirical approaches which have yielded at least a reasonable level of confidence, from a statistical standpoint, that a particular spoken word corresponded to a selected one of a limited machine vocabulary. The desirability of such schemes are thus not determinable by theoretical examination, but rather by a straightforward measure of recognition accuracy over an extended period of operation.

For various reasons, most prior art systems have been found unsuitable for practical applications. One of the prime reasons has been the sheer complexity of equipments that attempted to make an overly rigorous analysis of received speech signals. In addition to the expense and appurtenant unreliability, such systems have a tendency to establish highly complicated and restrictive recognition criteria that may reject normal variations of the system vocabulary words. Conversely, some equipments suffer from establishing recognition that are too easily met and result in the improper acceptance of extraneous words not included in the preselected vocabulary of the equipment.

In view of the above, it is the object of this invention to provide a speech recognition technique which yields heretofore unattained recognition accuracies without undue complexity.

SUMMARY OF THE INVENTION

The present invention is directed to an apparatus which receives spoken input training words and a subsequent spoken input command word and generates a correlation function that is indicative of the resemblance of the command word to each training word.

In accordance with the invention, a feature extraction means processes received input words and generates digital feature output signals on particular ones of a number of feature output lines. Means are provided for storing, as a time dependent matrix, the status of the feature signals which occur during each training word. Means are also provided for storing, as a time dependent matrix, the status of the feature signals which occur during the command word. Further means are provided for comparing, member by member, the command word matrix with each training word matrix and for generating a correlation figure which reflects each comparison.

In a preferred embodiment of the invention, means are provided for time normalizing the training word matrices and the command word matrix before the comparisons are made.

Further features and advantages of the invention will become more readily apparent from the following detailed description when taken in conjunction with the accompanying drawings.

DESCRIPTION OF THE PREFERRED EMBODIMENT

Figure 1:
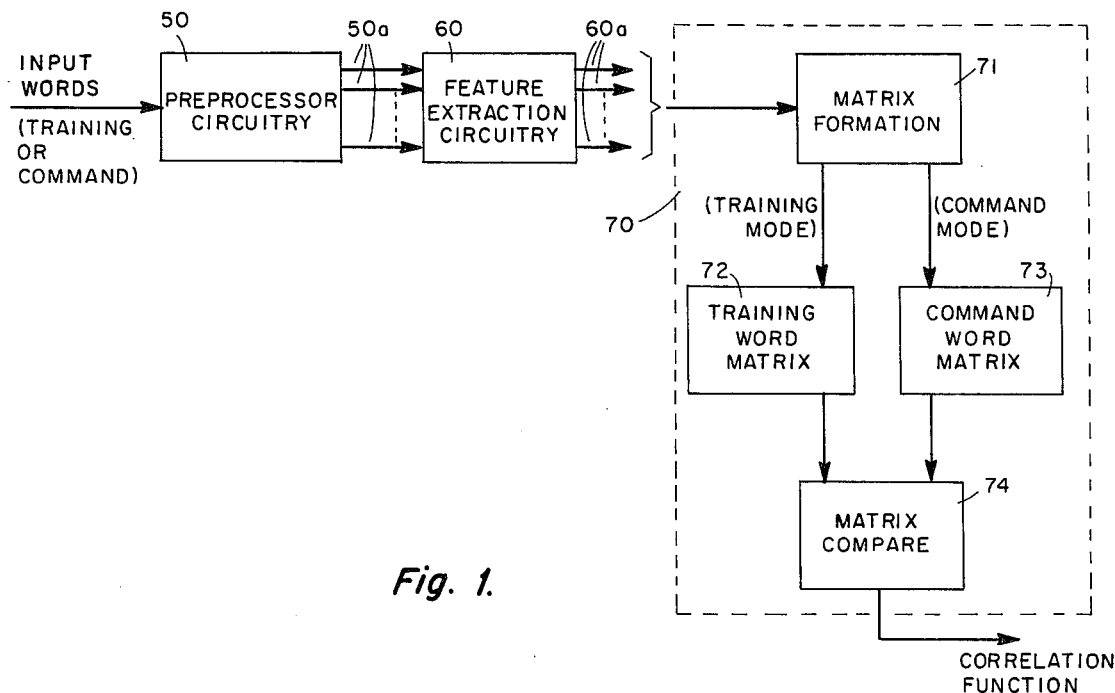
FIG. 1 is a simplified functional block diagram of an embodiment of the invention.

Referring to FIG. 1, there is shown a simplified functional block diagram of an apparatus in accordance with the invention. Input spoken words, which will be classified as either "training words" or "command words," are received by preprocessor circuitry 50 that utilizes a bank of bandpass filters to translate speech into a plurality of spectral component signals on lines 50a. (As referred to herein, the terms "input spoken words," "spoken words" and the like are intended to generically include any acoustical or electrical representation of communicative sounds. Typically, the circuitry 50 is adapted to receive word communications directly from an individual, or word-representative electrical signals from over a telephone line or tape recorder.) The processed spectral component signals on lines 50a are received by feature extraction circuitry which generates feature output signals on particular ones of a number of feature output lines 60a. Signals on these feature lines may represent, for example, the presence of commonly used vowel and consonant sounds. As will be further described, the circuitry 50 and 60 may be of a type that is known in the prior art.

The feature output signals on lines 60a, which are preferably in binary form, are received by subsequent processing circuitry, the functions of which are generally shown within the dashed enclosure 70. In the present embodiment the functions illustrated within the enclosure 70 are accomplished by appropriate programming of a commercially available general purpose minicomputer, e.g. the Model PDP-11 manufactured by Digital Equipment Corp., but it will be appreciated that alternate means such as a special purpose computer or other circuitry including a storage capability could be utilized to achieve the desired functions. The status of the feature signals on lines 60a which occur during an input spoken word are stored as a time dependent matrix, as is represented by the block 71. It was indicated that the input spoken words are classified as either training words or command words. The classification depends on the present mode of operation of the equipment. During the training mode, the equipment is "trained" or "loaded" with new vocabulary words, preferably spoken by the person who is to later use the machine during its command mode. When the command mode is active, the equipment generates an indication as to which previously stored training word corresponds most closely to a just-spoken command word.

When the training mode is active, the matrix corresponding to the received input training word it stored at a designated address location. This function is indicated by the block 72. During a typical training session, training word matrices will be stored for as many words as the equipment is capable of handling in its vocabulary at a time. As will become clear, the maximum vocabulary depends upon storage capacity and available processing time. For purposes of illustration, the present embodiment is designed to have a thirty word vocabulary, although larger vocabularies can be implemented if desired. Thus, thirty training word matrices are stored during the training mode.

When the command mode is active, as is the case during the majority of operational time, a spoken input command word is converted to a time dependent feature matrix (block 71). In this instance, the command word matrix is stored at a particular address location (represented by block 73) where it is available for comparison with each of the thirty previously stored training word matrices. This activity, represented functionally by the block 74, involves a member-by-member comparison of the command word matrix with each training word matrix and the generation of a correlation figure for each comparison. The particular training word matrix that yields the highest correlation figure is then selected as the most likely match. Further predetermined criteria are subsequently utilized to decide whether the match is sufficiently close to the particular training word to generate an occurrence indication for that training word.

Figure 2A:
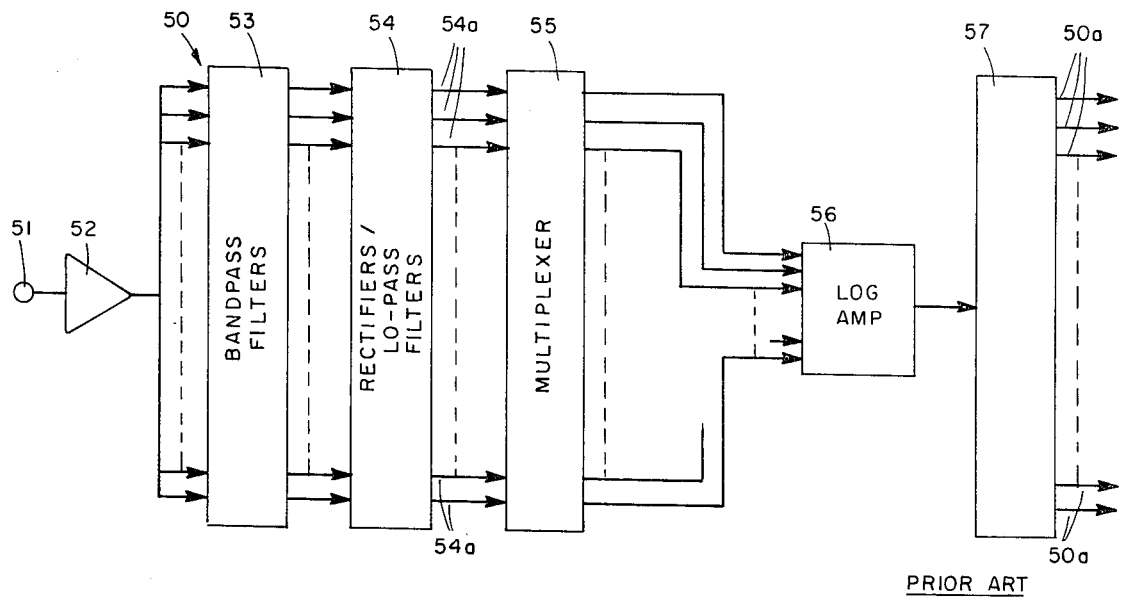
FIG. 2A is a block diagram of prior art preprocessor circuitry.
Figure 2B:
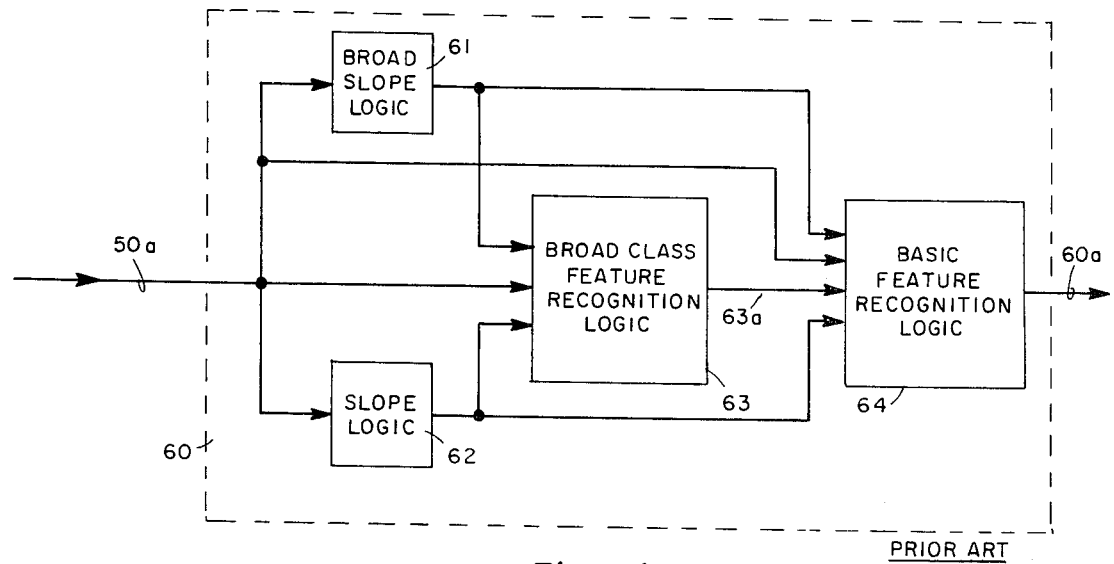
FIG. 2B is a block diagram of prior art feature extraction circuitry.

FIGS. 2A and 2B illustrate, in some further detail, portions of the apparatus of FIG. 1. A full description of appropriate types of preprocessor circuitry 50 and feature extraction circuitry 60 can be found in a publication entitled "Acoustic Recognition of A Limited Vocabulary of Continuous Speech" by T. B. Martin and published by University Microfilms, Ann Arbor, Mich. It should be emphasized, however, that the present invention deals largely with already-processed feature signals and any suitable means for obtaining the feature signals can be employed. Accordingly, the extent of detail set forth herein is limited to that needed to facilitate understanding of the portions of the apparatus thought inventive.

FIG. 2A is a block diagram of the preprocessor circuitry 50. A transducer 51, typically a gradient microphone, receives input spoken words and produces time-varying electrical signals that are representative of the received sounds. The output of transducer 51 is coupled, via preamplifier 52, to nineteen contiguous bandpass filters in a filter bank 53. Each filter in the bank produces an output signal related to that portion of the input signal which lies in the range of frequencies passed by the particular filter. Typically, the filter center frequencies range from about 250 to about 7500 Hz with the lowest filter bandwidth being about 150 Hz.

The output of each filter in the bank 53 is individually coupled to a full wave rectifier and lowpass filter combination located in a rectifier/low-pass filter bank 54. After rectification and filtering, the outputs of the bank 54 essentially represent the energy levels of the input signal at about the center frequencies of each of the bandpass filters in the bank 53. Viewed in another way, the signals on lines 54a collectively represent the envelope of the energy vs. frequency spectrum of the received input signal taken over the frequency range of interest.

The nineteen channels of information on lines 54a are logarithmically compressed to produce the spectral component outputs on lines 50a of the preprocessor. Logarithmic compression facilitates subsequent processing in two ways. First, it provides dynamic range compression that simplifies the engineering design requirements of feature extraction circuitry 60. Secondly, by virtue of using logarithms, comparative ratios of the spectral component signals can be readily computed by subtraction. Ratios are desirable processing vehicles in that they are independent of changes in overall signal amplitudes. This property is particularly advantageous in a system where input of varying loudness is to be recognized.

In the diagram of FIG. 2A, a single log amplifier 56 is time shared to avoid the necessity of using nineteen identical amplifiers to achieve compression. The outputs on lines 54a are effectively sampled by a multiplexer 55 and the sampled signals passed, one at a time, through the shared amplifier 56. A demultiplexer 57 then "reconstructs" compressed spectral component signals on lines 50a from the processed sampled signals. The sampling clock rate of the multiplexer and demultiplexer is above 1 kilohertz and is safely higher than is necessary to retain the low pass filter signal bandwidths. This technique of sharing a single logarithmic amplifier is known in the art and is disclosed, for example, in U.S. Pat. No. 3,588,363 of M. Herscher and T. Martin entitled "Word Recognition System for Voice Controller" as well as in the above-referenced publication of T. Martin.

It will be recalled that the spectral component signals on lines 50a are entered into a feature extraction circuitry 60 (FIG. 1) which senses the presence of properties of the spectral component signals that correspond to preselected properties or "features" of input words. In the particular prior art system being described for illustration, this sensing of properties or "feature extraction" is achieved in part by deriving quantities known as "slope" and "broad slope" characterisitcs. These quantities give indication as to the polarity and magnitude of the slope of the input envelope when taken over specified segments of frequency spectrum. The manner in which these quantities are obtained is described in the above-referenced publication and patent.

FIG. 2B shows a block diagram of the prior art feature extraction circuitry 60 which receives the spectral component signals on the lines 50a. The circuitry 60, which is also described in the referenced publication and patent, includes logic blocks 61 and 62 which derive sets of slope and broad slope quantities that are received by a "broad class feature" recognition logic block 63. The block 63 utilizes groups of operational amplifiers and appropriate peripheral circuitry to generate broad class feature signals 63a that indicate the presence of certain broadly classified phonetic characteristics in the input words. Examples of the broad classifications are "vowel/vowel-like", "voicing only", "burst", "voiced noise-like consonant" etc. The signals 63a as well as the spectral component signals, slope, and broad slope signals are received by a "basic feature" recognition logic block 64. This block, which includes components that are similar in nature to the block 63, functions to generate the feature signals that indicate the presence of specific phonetic features (e.g. /I/, /s/, /θ/, /ʃ/) of the input spoken words. Generally, the hierarchical structure will include an intermediate logic block that derives "common group features" (e.g. "front vowel", "back vowel", "fricative", "stop consonant", etc.) or, alternatively, such common group features may be the most specific features derived for further processing by the sequential decision logic (FIG. 1). It will become clear that the present invention is applicable to the processing of various kinds of feature signals. Narrowly defined phonetic feature signals facilitates explanation of subsequent circuitry and the digital feature signals on lines 60a will therefore be assumed to be of this form. It should be emphasized, however, that the invention to be described is not limited to any particular form of feature signal generation, as long as the generated features are digital in nature.

In the present embodiment thirty-two binary feature signals, designated $f_0$ through $f_{31}$, are derived on thirty-two separate lines 60A. The feature signals $f_1$ through $f_{31}$ continuously indicate the presence or absence of a specific phonemic feature while the feature $f_0$ indicates the presence of any input sounds which may be speech. The conditional language is used because subsequent processing is employed to eliminate short duration occurrences of $f_0$ that are more likely noise than actual speech. In this embodiment the minimum allowable duration for $f_0$ is 250 milliseconds.

The computer means 70 receives the feature signals $f_0$ through $f_{31}$ as is shown in FIG. 1. The general "speech presence" feature, $f_0$, is utilized by the computer to tell when it need monitor the specific features $f_1$ through $f_{31}$. Also, as will become clear hereinafter, the duration of $f_0$ is noted by the computer and later utilized as a base for time normalization of the feature matrix of the input word. There are various known techniques for generating a speech presence feature such as $f_0$, the simplest being to "OR" all of the specific features in conjunction with an energy threshold requirement. Typically, the circuitry for generating $f_0$ is provided with some inherent hysteresis; i.e., it will not turn off its output ($f_0$) until it senses that there has been no input speech for at least some predetermined time, for example 200 milliseconds. This technique is necessary because many words naturally include pauses of substantial duration. Absent the hysteresis, the apparatus would interpret the first part of the word as an entire word. However, the presence of this hysteresis gives rise to a requirement that successive input words be separated by at least the predetermined time, lest they be interpreted as a single word.

When the presence of $f_0$ is detected by computer means 70, the monitoring and storage of the status of $f_1$ through $f_{31}$ begins. When $f_0$ exceeds the minimum time threshold, 250 milliseconds in this case, the input sounds are considered a word (rather than noise) and the stored feature matrix is further processed in a manner to be described. When the end of $f_0$ is detected, the stored word matrix is complete, and has a dimension of 32 × T, where T represents the duration of the word, i.e. the true duration of $f_0$. Since the true $f_0$ can vary from 250 milliseconds to, say, 1500 milliseconds, the matrix can have an overall dimension ranging from 32 × 250 to 32 × 1500. It will become apparent, however, that the duration of the input word is not critical since subsequent time normalization is implemented. In this manner the dependence on the speed with which the speaker states the particular input word is minimized.

Figure 3:
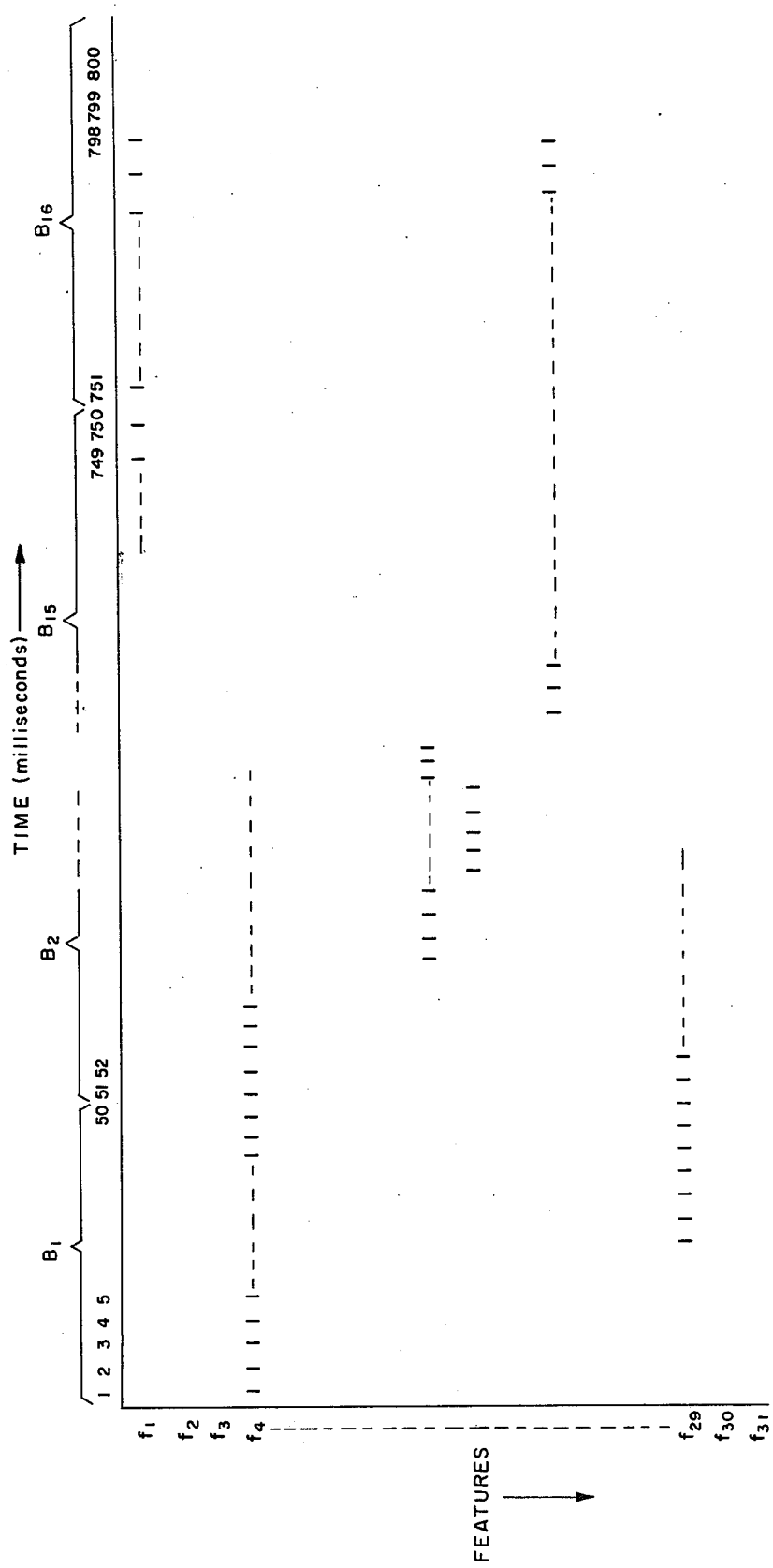
FIG. 3 helps illustrate the type of matrix that results from storing the status of binary features which occur during a spoken input word.

FIG. 3 illustrates the type of matrix that results from storing the status of the binary features which occur during an input word. In the example of FIG. 3 it is assumed, for purposes of illustration, that the input word had a time duration of 800 milliseconds. This means that the resultant matrix has dimensions of 31 × 800. In other words, it records the presence or absence of each of 31 features over 800 sampled time slots. As is seen from the representative "1"'s of the FIGURE (inserted arbitrarily for illustration), different features occur for varying portions of the word duration with a particular feature usually being "on" continuously for a number of milliseconds. The absence of a "1" in a matrix position implies a "0"; i.e., the absence of the feature. The time normalization function, performed by the computer, reduces each input word matrix to a 31 × 16 matrix, the time axis being reduced down to 16 normalized time slots. The normalization can be performed in a number of ways, the technique of the present embodiment involving the selection of the normalized time periods which include a majority of "1"'s. The arithmetic process for carrying out this technique is quite straightforward for the computer, basically involving simple division and counting. To illustrate, in the example of FIG. 3 the 800 time slots for each feature would be divided into groups of 50 as shown by the brackets labeled $B_1$ through $B_{16}$. Each bracket contains 50 time slots so, in this example, a particular normalized time slot for a feature will be assigned a "1" if the bracket contains at least 26 "1"'s. In FIG. 3, the feature $f_1$ has a majority of "1"'s in the time included in bracket $B_{16}$. Therefore, the 16th and last normalized time slot for $f_1$ will contain a "1". An entire 31 × 16 normalized matrix is formed in this manner by examining the count of ones under each of 16 brackets for each of the 31 features. In the example given, the overall time is an exact multiple of 16, but if this is not the case, the computer is programmed to distribute any remainder among the brackets in a specified manner. For example, if there had been originally 803 time slots (milliseconds), then each of the first three brackets would have included 51 milliseconds rather than 50, the remainder of the brackets including 50 milliseconds.

Figure 4:
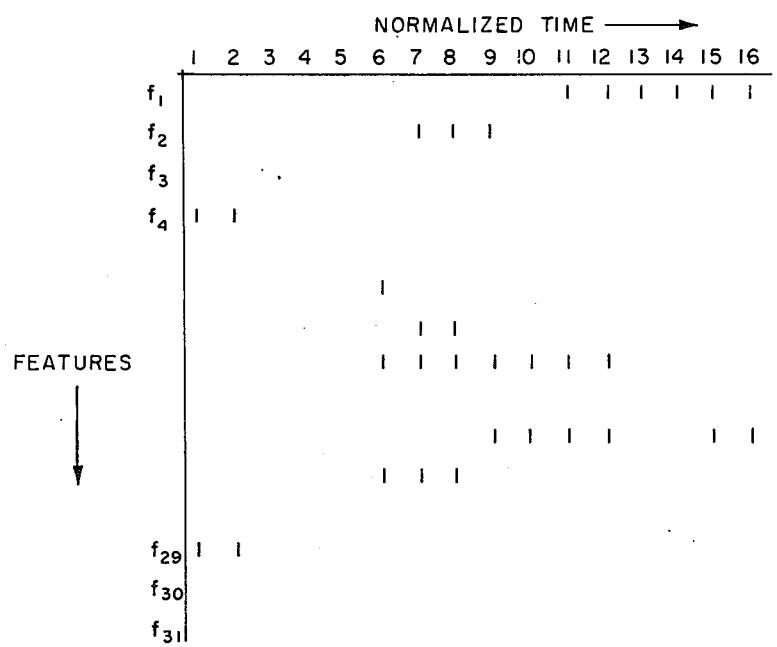
FIG. 4 helps illustrate a typical normalized matrix for an input spoken word.

FIG. 4 illustrates a typical normalized matrix for an input word with the "1"'s again being shown and "0"'s being implied by the absence of a "1" at a matrix position.

Figure 5A:
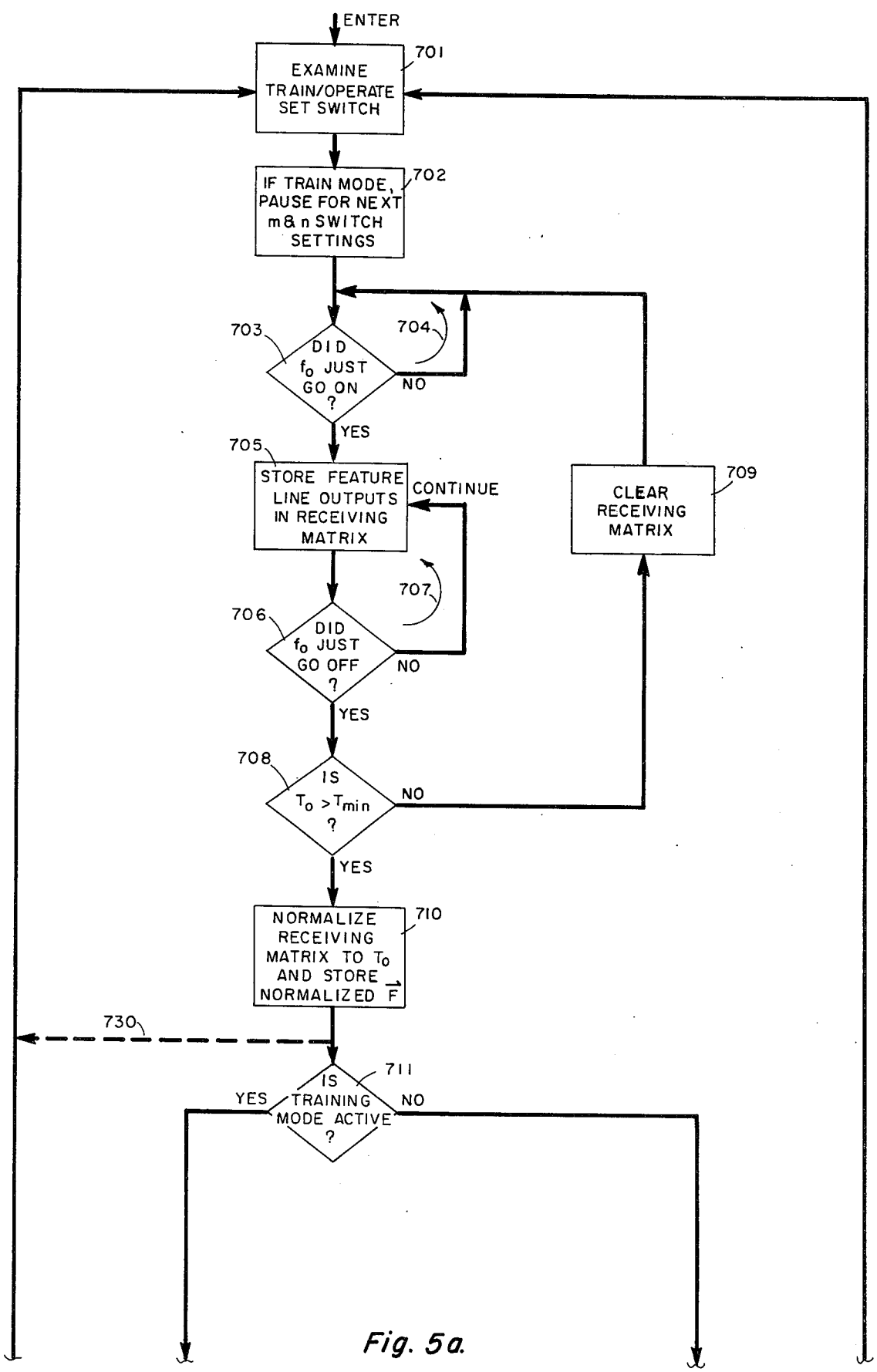
FIGS. 5A and 5B, when placed one below another longitudinally, illustrate a simplified flow chart of a computer program utilized to implement certain functions in accordance with the invention.
Figure 5B:
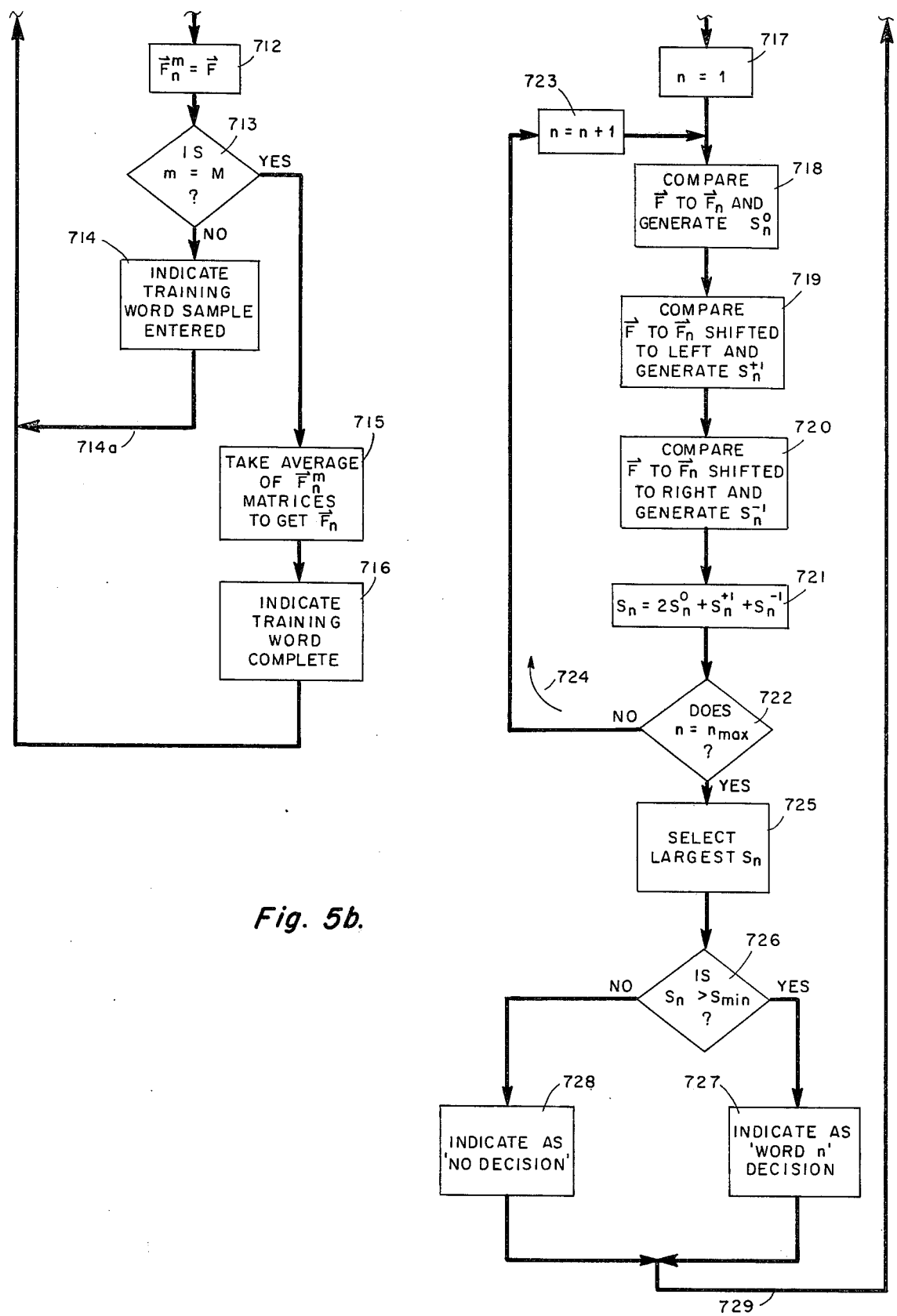

FIGS. 5A and 5B illustrate a simplified flow chart of the computer program utilized to implement the functions which were defined broadly within the enclosed area 70 of FIG. 1. As previously indicated, the computer receives as inputs the features $f_0$ through $f_{31}$ and it also receives indications from the operator (in the form of set switch manipulations) that direct the training and command phases of operation. When the routine is entered, the first significant operation is to examine the status of the operator controlled set switch which determines whether the apparatus is in its train mode or its operate mode. This function is represented by the block 701. If the training mode is indicated, the machine will examine two other switch settings referred to as $m$ and $n$ (block 702), the purpose of these input parameters to be described at a later point. The computer then awaits the onset of $f_0$, as is indicated by the decision diamond 703 in conjunction with the closed "no" loop 704. When $f_0$ occurs, the "yes" branch will be active and the block 705 entered. This block defines the function of continuously sampling and storing the status of features $f_1$ through $f_{31}$ to form a receiving matrix of the type shown in FIG. 3. This operation continues by virtue of decision diamond 706 in conjunction with loop 707 until $f_0$ terminates whereupon the "yes" branch of diamond 706 is active. The duration T of the just-ended input word is then examined (diamond 708) to determine if T is greater than some predetermined time $T_{min}$ which, in the present embodiment, is set at 250 milliseconds. If T is too short, the block 709 functions to clear the receiving matrix and diamond 703 is again entered to await the next onset of $f_0$.

When T is greater than $T_{min}$, the receiving matrix is normalized to a 31 × 16 normalized matrix designated as $\vec{F}$, as is indicated by the block 710. The normalization is a relatively straightforward arithmetic operation of the type described in conjunction with FIG. 4. The next operation is to determine which mode is active (diamond 711) and, if the training mode is active, the block 712 is entered. This block represents the function of establishing a matrix $\vec{F}_n^m$ equal to the matrix $\vec{F}$. The subscript $n$ designates the number of the particular word being entered, for example, the sixteenth word of a thirty word vocabulary. The superscript $m$ indicates the sample count for the particular training word being entered. As was indicated above, it is desirable to use multiple samples of the same training word to obtain a faithful average sample that truly represents the manner in which the speaker utters the word in question. In the present embodiment, five samples of each training word are utilized, although this choice is somewhat arbitrary and dependent upon practical considerations, a relatively large number of samples being most desirable but requiring a longer training period. In the present program, the values of $m$ and $n$ are established by an operator during the training period and are changed after each word and each sample. It will be appreciated, however, that these parameters can be incremented automatically, with the computer giving indication as to which word number and sample are to be entered next.

The next operation is to determine whether $m$ is equal to the maximum number of samples being utilized in the routine, designated as M. In the present embodiment M is 5, so if the sample number for the particular training word is less than 5, the "no" output of diamond 713 is active and the computer output will indicate that the training word sample has been entered and that the next sample for that training word should be taken by the operator. When this indication is acknowledged, the branch 714a routes the program back to block 701 and the next switch setting (of $m$) is made by the operator in anticipation of receiving the next sample of the training word. Thus, for example, if the first sample of the first training word had just been entered, the operator will change the set switch that controls $m$ to $m=2$ and the system will operate in the manner just described to enter the next spoken word as the normalized matrix $\vec{F}_1^2$.

When the required five samples of a training word have been entered, $m$ will equal M and the "yes" output of diamond 713 will be active so that block 715 is entered. This block represents the function of averaging the $\vec{F}_n^m$ matrices of the training word samples to obtain a final matrix for the training word, designated $\vec{F}_n$ (without superscript). Again, the averaging is a relatively straight-forward operation in which the total number of "1"s that appear at each of the 496 matrix positions (31 × 16) is counted, and a "1" is inserted in the corresponding positions of the final matrix whenever the total equals or exceeds some predetermined threshold number. In the present embodiment, for example, an appropriate threshold has been found to be three, so any matrix position that is a "1" in at least three of the five sample training word matrices will get a "1" in the final stored matrix for that training word.

When the averaging of block 715 is accomplished and the matrix $\vec{F}_n$ stored, the computer indicates that the particular training word has been "completed" (block 716); i.e., that its final matrix has been computed and stored. The operator will then typically increment $n$ to the next training word number and continue the training procedure, or, if training is complete, set the equipment to the operate mode.

When the equipment is in the operate mode, a received word is processed in the previously described manner up to the point where the normalized matrix $\vec{F}$ is stored. At that point, the diamond 711 will indicate a "no" and the block 717 is entered. The function of block 717 is to set the training word index, $n$, to one so that the stored training word matrices, starting with $\vec{F}_1$, can be called up from memory for comparison with the input command word matrix $\vec{F}$. The next block, 718, represents the function of comparing the matrix $\vec{F}$ to the matrix $\vec{F}_n$, point by point. In the present embodiment, the comparison yields a sum generally designated $S_n^0$. It is convenient in explaining the attainment of this sum and of subsequently developed sums of different form to refer to the members of a matrix $\vec{F}$ by the notation F ($f_i$, $t_j$) where "$f_i$" indicates the ith feature and "$t_j$" indicates the jth normalized time slot. In formulating the sum $S_n^0$, each member F ($f_i$, $t_j$) of $\vec{F}$ is compared to the corresponding member $F_n$ ($f_i$, $t_j$) of the training word matrix $\vec{F}_n$. It has been found that a most useful comparison results from observing the matching or non-matching of "1"s in the two matrices being compared in accordance with the following rule: If a particular matrix position has "1"s in both matrices the sum is increased by one and if only one of the two matrices has a "1" at the position the sum is decreased by one. If the particular position has "0"s in both matrices, nothing is added to or subtracted from the sum. The sum is thus dependent only on the correlation or non-correlation of features which actually occur (during either the training word or the command word) and not upon correlation of the absence of features. In this manner, words with a small number of feature characteristics will not yield an unrealistically high correlation sum by virtue of the absence of features.

Returning to the block 718, the sum $S_1^0$ is derived by the computer in accordance with the comparison rules just set forth. Typically, $S_1^0$ is set initially at zero and the values of the indices $i$ and $j$ are set initially to one. The matrix members F $(f_1,t_1)$ are then compared. If both are "1"'s, $S_1^0$ is incremented by +1. If the two have different values (i.e., a "1" and a "0"), then $S_1^0$ is incremented by −1. If both are "0"'s, the sum $S_1^0$ is uneffected. The values of indices $i$ and $j$ are subsequently advanced and the corresponding members of the matrices are compared, in iterative fashion, until the final sum $S_1^0$ (which may be positive or negative) is attained.

After the overall sum $S_1^0$ has been computed, two supplementary comparisons are performed as between the command word matrix $\vec{F}$ and the first training word matrix $\vec{F}_1$. These comparisons result in two sums generally designated $S_n^{+1}$ and $S_n^{-1}$, and being specified as $S_1^{+1}$ and $S_1^{-1}$ when the index $n$ is one. Generally, the sum $S_n^{+1}$ is obtained by comparing all the members F $(f_i,t_j)$ of the command word matrix with the members $F_n$ $(f_i,t_{j+1})$ of the matrix for the training word $n$. Similarly, the sum $S_n^{-1}$ is obtained by comparing all the members F $(f_i,t_j)$ of the command word matrix with the members $F_n$ $(f_i,t_{j-1})$ of the matrix for training word $n$. These operations can be pictured as point by point comparisons of the two matrices with the training word matrix first being shifted to the left by one normalized time slot (to compute $S_1^{+1}$) and then to the right by one time slot (to compute $S_1^{-1}$). It is helpful in picturing these comparisons to visualize the training word matrix $\vec{F}_1$ and being laid directly over the command word matrix $\vec{F}$. The main comparison was made in this aligned position and the sum $S_1^0$ generated. Now, the matrix $\vec{F}_1$ can be pictured as being moved to the left by one time slot position so that the first time slot column ($t=1$) of $\vec{F}_1$ is "hanging over air" and the last time slot column ($t=16$) is overlapping the next to last column ($t=15$) of $\vec{F}$. The comparison is then made and the sum $S_1^{+1}$ generated in accordance with the rules set forth. For example, point $F_1$ $(f_1,t_2)$ is compared to point F $(f_1,t_1)$, and point $F_1$ $(f_1,t_3)$ compared to point F $(f_1,t_2)$, and so on. Again, the indices $i$ and $j$ can be utilized to perform the iteration, to achieve the overall $S_1^{+1}$ but with $j$ going only from $j=1$ to $j=15$, since only 15 time slot columns overlap and are available for comparison.

The formulation of $S_n^{+1}$ is represented by block 719 and the subsequent formulation of $S_1^{-1}$ is represented by block 720. In computing $S_1^{-1}$, the matrix $\vec{F}_1$ can be envisioned as overlapping $\vec{F}$ and shifted to the right by one time slot position. In such case we have the comparison of the points F $(f_i,t_j)$ with the points F $(f_i,t_{j-1})$ and the index $j$ goes from $j=2$ to $j=16$ during iteration.

After the sums $S_n^0$, $S_n^{-1}$, and $S_n^{-1}$ are calculated, a composite sum $S_n$ (without superscript) is formed (block 721) in accordance with the relationship $$S_n = 2S_n^0 + S_n^{+1} + S_n^{-1}.$$

This composite sum, which is designated $S_1$ for the comparison of the first training word with the command word, is seen to "weigh" the main sum by a factor of two with respect to each supplementary sum. This weighting relationship has been found to yield favorable results, but other weighting relationships could be utilized if desired.

The supplementary comparisons have been found to yield useful correlation information in that they reduce dependence on the exact duration and timing of the features in the command word matrix. Prior time normalization largely removed dependence on the duration of the entire word; i.e., if a word is uniformly stretched out or compressed it will still yield the same normalized matrix. This technique, however, does not alone provide for situations where an individual may slightly dwell on certain features of a word or may slightly abbreviate features. These phenomena tend to occur non-uniformly and may result in a command word matrix that has shifted somewhat from the training word matrix previously stored for the particular vocabulary word. The direction or magnitude (on the time axis) of the shift is not determinable beforehand. It has been found, though, that a composite sum which takes into account comparisons that are shifted slightly on the time axis yields favorable results. Specifically, the probability of attaining the proper match has been found to be greater than in schemes that utilize only the main sum ($S_n^0$).

When the first composite sum, $S_1$, has been obtained, the index $n$ is examined (diamond 722) and, since all training words have not yet been examined, the "no" answer leads to block 723 where $n$ is incremented to two. A composite sum $S_2$ is then computed by comparing the matrix for the command word, $\vec{F}$, with the matrix for the second training word, $\vec{F}_2$. The loop 724 then continues until composite sums have been computed for all training words whereupon the index $n$ equals $n_{max}$. In the present embodiment, $n_{max}$ equals 30 since there are thirty training words.

The next step is the determination of the largest $S_n$ from among the "list" of 30 composite sums which have been compiled. This function is represented by the block 725. This determination yields the particular training word $n$ that is the closest choice for a match with the command word. Further criteria are then preferably used to decide whether the match is close enough to make a "word $n$" decision. In the present embodiment the largest composite sum $S_n$ is tested against a predetermined level, $S_{min}$, and a decision selecting word $n$ as the command word is made only if $S_n$ exceeds $S_{min}$ (diamond 726). Thus, for example, the word $n$ may be selected (block 727) only if the largest $S_n$ is greater than zero. If this $S_n$ has a negative value, a "no decision" indication (block 728) is given. In either case, the "examine set switch" block 701 is re-entered via line 729. Processing time is dependent upon the number of vocabulary words and the inherent speed of the minicomputer, but is typically of the order of 50 milliseconds. Provision can be made, if desired, for receiving a new command word while processing for the previous command word is still taking place. This function is shown, for example, by the dashed-line branch 730 which causes re-entry to block 701 after the matrix $\vec{F}$ for the previous command word has been formed. The features of the next command word would then be monitored while the comparison routines are occurring. In such case, the blocks 727 and 728 would merely lead to a "pause" block (not shown).

There are various alternate criteria that could be established for determining whether the largest $S_n$ should lead to a "word $n$" decision. For example, it could be required that the largest $S_n$ exceed the second largest $S_n$ by some predetermined amount before a word decision is made. This type of restriction could also be an additional requirement along with that of diamond 72b.

The invention has been described with reference to a particular embodiment, but it will be appreciated that variations within the spirit and scope of the invention will occur to those skilled in the art. For instance, some of the operations set forth in the flow chart of FIG. 5 could be performed in different order to achieve the desired functions.

We claim:

1. Apparatus which receives spoken input training words and a subsequent spoken input command word and generates a correlation function that is indicative of the resemblance of the command word to each training word, comprising:
   a. feature extraction means for processing received input words and generating digital feature output signals on particular ones of a number of feature output lines, the particular ones being dependent upon the features present in an input word;
   b. means for storing, as a time dependent matrix, the presence or absence status of the feature signals which occur during each training word;
   c. means for storing, as a time dependent matrix, the presence or absence status of the feature signals which occur during the command word; and
   d. means for comparing, member by member, the command word matrix with each training word matrix and for generating a correlation figure which reflects each matrix comparison, the member comparisons taking account only of the presence of features in the matrices being compared.

2. Apparatus as defined by claim 1 further comprising means for time normalizing the training word matrices and the command word matrix before the comparisons thereof.

3. Apparatus as defined by claim 1 wherein the correlation figure for each matrix comparison is a sum of positive and negative member comparisons, a positive comparison being indicated by the presence of a feature at a member position in both of two matrices being compared, and a negative comparison being indicated by the presence of a feature at a member position in only one of two matrices being compared.

4. Apparatus as defined by claim 1 further comprising means for comparing, on a time shifted basis, the command word matrix with each training word matrix and for generating a supplementary correlation figure which reflects each such comparison.

5. Apparatus as defined by claim 1 further comprising means for comparing, on a time shifted basis, the command word matrix with each training word matrix and for generating a supplementary correlation figure which reflects each such comparison.

6. Apparatus as defined by claim 5 further comprising means for time normalizing the training word matrices and the command word matrix before the comparisons thereof.

7. A method for receiving spoken input training words and a subsequent spoken input command word and generating a correlation function that is indicative of the resemblance of the command word to each training word, comprising the steps of:
   a. extracting features from received input words and generating digital feature output signals on particular ones of a number of feature output lines, the particular ones being dependent upon the features present in an input word;
   b. storing, as a time dependent matrix, the presence or absence status of the feature signals which occur during each training word;
   c. storing, as a time dependent matrix, the presence or absence status of the feature signals which occur during the command word; and
   d. comparing, member by member, the command word matrix with each training word matrix and generating a correlation figure which reflects each matrix comparison, the member comparison taking account only of the presence of features in the matrices being compared.

8. The method as defined by claim 7 further comprising a step of time normalizing the training word matrices and the command word matrix before the comparisons thereof.

9. The method as defined by claim 7 further comprising the step of comparing, on a time shifted basis, the command word matrix with each training word matrix and generating a supplementary correlation figure which reflects each comparison.

10. The method as defined by claim 8 further comprising the step of comparing, on a time shifted basis, the command word matrix with each training word matrix and generating a supplementary correlation figure which reflects each comparison.

11. Apparatus as defined by claim 2 wherein said means for time normalizing divides each training word and the command word into a predetermined number of time slots of substantially equal duration.

12. Apparatus as defined by claim 6 wherein said means for time normalizing divides each training word and the command word into a predetermined number of time slots of substantially equal duration.

13. Apparatus which receives spoken input training words and the subsequent spoken input command word and generates a correlation function that is indicative of the resemblance of the command word to each training word, comprising:
   a. feature extraction means for processing received input words and generating digital feature output signals on particular ones of a number of feature output lines, the particular ones being dependent upon the features present in an input word;
   b. means for storing, as a time dependent matrix, the status of the feature signals which occur during each training word;
   c. means for storing, as a time dependent matrix, the status of the feature signals which occur during the command word;
   d. means for comparing, member by member, the command word matrix with each training word matrix and for generating a correlation figure which reflects each comparison; and
   e. means for comparing, on a time shifted basis, the command word matrix with each training word matrix and for generating a supplementary correlation figure which reflects each such comparison.

14. Apparatus as defined by claim 13 further comprising means for time normalizing the training word matrices and the command word matrix before the comparisons thereof.

15. Apparatus as defined by claim 14 wherein said means for time normalizing divides each training word and the command word into a predetermined number of time slots of substantially equal duration.

16. Apparatus as defined by claim 15 further comprising means responsive to said correlation figure and supplementary correlation figure for generating an occurrence indication indicative of the training word which corresponds most closely to the command word.

17. Apparatus as defined by claim 16 wherein said means for generating an occurrence indication includes means for determining whether said combined correlation figure and supplementary correlation figure exceeds a predetermined threshold.

18. Apparatus which receives spoken input training words and a subsequent spoken input command word and generates an occurrence indication indicative of the training word which corresponds most closely to the command word, said occurrence indication being suitable for control of a companion system, comprising:
   a. feature extraction means for processing received input words and generating digital feature output signals on particular ones of a number of feature output lines, the particular ones being dependent upon the features present in an input word;
   b. means for storing, as a time dependent matrix, the presence or absence status of the feature signals which occur during each training word;
   c. means for storing, as a time dependent matrix, the presence or absence status of the feature signals which occur during the command word; and
   d. means for comparing, member by member, the command word matrix with each training word matrix, the member comparisons taking account only of the presence of features in the matrices being compared, and for generating said occurrence indication for the training word whose matrix corresponds with at least a predetermined degree of similarity to the command word matrix.

19. Apparatus as defined by claim 18 wherein each matrix comparison is a sum of positive and negative member comparisons, a positive comparison being indicated by the presence of a feature at a member position in both of two matrices being compared and a negative comparison being indicated by the presence of a feature at a member position in only one of two matrices being compared.

20. Apparatus as defined by claim 18 further comprising means for comparing, on a time shifted basis, the command word matrix with each training word matrix.

21. Apparatus as defined by claim 18 further comprising means for time normalizing training word matrices and the command word matrix before the comparison thereof.

22. Apparatus as defined by claim 21 wherein said means for time normalizing divides each training word and a command word into a predetermined number of time slots of substantially equal duration.

23. Apparatus which receives spoken input training words and a subsequent spoken input command word and generates an occurrence indication indicative of the training word which corresponds most closely to the command word, said occurrence indication being suitable for control of a companion system, comprising:
   a. feature extraction means for processing received input words and generating digital feature output signals on particular ones of a number of feature output lines, the particular ones being dependent upon the features present in an input word;
   b. means for storing, as a time dependent matrix, the status of the feature signals which occur during each training word;
   c. means for storing, as a time dependent matrix, the status of the feature signals which occur during the command word;
   d. means for comparing, member by member, the command word matrix with each training word matrix; and
   e. means for comparing, on a time shifted basis, the command word matrix with each training word matrix, and for generating said occurrence indication for the training word whose matrix corresponds, in accordance with the defined comparisons, with at least a predetermined degree of similarity to the command word matrix.

24. Apparatus as defined by claim 23 further comprising means for time normalizing the training word matrices and the command word matrix before the comparisons thereof.

25. Apparatus as defined by claim 24 wherein said means for time normalizing divides each training word and the command word into a predetermined number of time slots of substantially equal duration.

26. A method for receiving spoken input training words and a subsequent spoken input command word and generating an occurrence indication indicative of the training word which most closely resembles the command word, said occurrence indication being suitable for control of a companion system, comprising the steps of:
   a. extracting features from received input words and generating digital feature output signals on particular ones of a number of feature output lines, the particular ones being dependent upon the features present in an input word;
   b. storing, as a time dependent matrix, the presence or absence status of the feature signals which occur during each training word;
   c. storing, as a time dependent matrix, the presence or absence status of the feature signals which occur during each command word; and
   d. comparing, member by member, the command word matrix with each training word matrix, the member comparisons taking account only of the presence of features in the matrices being compared, and generating said occurrence indication for the training word whose matrix corresponds with at least a predetermined degree of similarity to the command word matrix.

27. A method for receiving spoken input training words and a subsequent spoken input command word and generating an occurrence indication indicative of the training word which most closely resembles the command word, said occurrence indication being suitable for control of a companion system, comprising the steps of:
   a. extracting features from received input words and generating digital feature output signals on particular ones of a number of feature output lines, the particular ones being dependent upon the features present in an input word;
   b. storing, as a time dependent matrix, the status of the feature signals which occur during each training word;
   c. storing, as a time dependent matrix, the status of the feature signals which occur during the command word;
   d. comparing, member by member, the command word matrix with each training word matrix; and
   e. comparing, on a time shifted basis, the command word matrix with each training word matrix, and generating said occurrence indication for the training word whose matrix corresponds, in accordance with the defined comparisons, with at least a predetermined degree of similarity to the command word matrix.

* * * * *